(12) United States Patent
Chansarkar (10) Patent No.: US 8,935,093 B2
(45) Date of Patent: Jan. 13, 2015

(54) GNSS PERFORMANCE ENHANCEMENT USING ACCELEROMETER-ONLY DATA

(71) Applicant: CSR Technology Holdings Inc., Sunnyvale, CA (US)

(72) Inventor: Mangesh Chansarkar, Irvine, CA (US)

(73) Assignee: CSR Technology Holdings Inc., San Jose, CA (US)

( * ) Notice: Subject to any disclaimer, the term of this patent is extended or adjusted under 35 U.S.C. 154(b) by 0 days.

(21) Appl. No.: 13/676,047

(22) Filed: Nov. 13, 2012

(65) Prior Publication Data

US 2013/0282276 A1     Oct. 24, 2013

Related U.S. Application Data

(63) Continuation of application No. 12/695,934, filed on Jan. 28, 2010, now Pat. No. 8,311,740.

(51) Int. Cl.
| | |
|---|---|
| *G01S 1/00* | (2006.01) |
| *G01C 21/10* | (2006.01) |
| *G01C 19/00* | (2013.01) |
| *G01C 21/28* | (2006.01) |
| *G01S 19/26* | (2010.01) |

(52) U.S. Cl.
CPC .............. *G01C 21/28* (2013.01); *G01S 19/26* (2013.01)
USPC ........................ 701/472; 701/501; 702/104

(58) Field of Classification Search
USPC ................... 701/472, 501; 702/104, 151
See application file for complete search history.

(56) References Cited

U.S. PATENT DOCUMENTS

| | | | |
|---|---|---|---|
| 5,703,597 A | 12/1997 | Yu et al. | |
| 6,078,290 A | 6/2000 | McBurney et al. | |
| 6,308,134 B1 | 10/2001 | Croyle et al. | |
| 6,580,390 B1 | 6/2003 | Hay | |
| 6,697,736 B2* | 2/2004 | Lin ............................... | 701/472 |
| 7,139,651 B2 | 11/2006 | Knowlton et al. | |
| 7,171,303 B1* | 1/2007 | Nordmark et al. ............ | 701/472 |
| 7,668,629 B2* | 2/2010 | DiEsposti et al. .............. | 701/13 |
| 7,957,897 B2* | 6/2011 | Basnayake ................... | 701/501 |
| 7,979,207 B2 | 7/2011 | Chowdhary et al. | |
| 8,195,357 B2* | 6/2012 | Basnayake .................. | 701/33.1 |
| 8,239,162 B2* | 8/2012 | Tanenhaus .................... | 702/151 |

(Continued)

FOREIGN PATENT DOCUMENTS

| | | |
|---|---|---|
| EP | 1903306 | 3/2008 |
| JP | 08285621 | 11/1996 |
| WO | 02/018873 | 7/2002 |

OTHER PUBLICATIONS

Reddy, "On Stationary and NonStationary Models of Long Term Random Errors of Gyroscopes and Accelerometers in an Inertial Navigation System", published Apr. 2, 2007.

*Primary Examiner* — Thomas G Black
*Assistant Examiner* — Tyler Paige
(74) *Attorney, Agent, or Firm* — Pillsbury Winthrop Shaw Pittman LLP (57) ABSTRACT

The present invention provides apparatus and methods for improving satellite navigation by assessing the dynamic state of a platform for a satellite navigation receiver and using this data to improve navigation models and satellite tracking algorithms. The dynamic state of the receiver platform may be assessed using only accelerometer data, and does not require inertial navigation system integration. The accelerometers may not need to be very accurate and may not need to be aligned and/or accurately calibrated.

21 Claims, 4 Drawing Sheets

(56) References Cited

U.S. PATENT DOCUMENTS

| | | |
|---|---|---|
| 8,311,740 B2 * | 11/2012 | Chansarkar .................. 701/500 |
| 2004/0260468 A1 | 12/2004 | Bang et al. |
| 2007/0061077 A1 | 3/2007 | Fateh |
| 2007/0273582 A1 | 11/2007 | Klinghult et al. |
| 2008/0150797 A1 | 6/2008 | Jia et al. |
| 2008/0234933 A1 | 9/2008 | Chowdhary et al. |
| 2010/0121573 A1 | 5/2010 | Imafuku et al. |
| 2011/0077891 A1 * | 3/2011 | Koenig ........................ 702/104 |

\* cited by examiner

PRIOR ART

GNSS PERFORMANCE ENHANCEMENT USING ACCELEROMETER-ONLY DATA

CROSS-REFERENCE TO RELATED APPLICATIONS

The present application is a continuation of U.S. patent application Ser. No. 12/695,934 filed Jan. 28, 2010, now U.S. Pat. No. 8,311,740, the contents of which are incorporated herein by reference in their entirety.

FIELD OF THE INVENTION

The present invention is related to satellite navigation and tracking enhancement, and more particularly to using accelerometer-only data from uncalibrated and unaligned accelerometers to assist satellite navigation and tracking.

BACKGROUND OF THE INVENTION

The performance of Global Navigation Satellite Systems (GNSS), such as the Global Positioning System (GPS) and other satellite based navigational systems, may be enhanced by inertial navigation systems (INSs), which utilize inertial measurement units such as gyroscopes and accelerometers to measure changes in direction and acceleration. See FIG. 1. Other inertial measurements that may be used are car odometer readings, wheel ticks from car wheels, and angle of a car steering wheel. INSs may be integrated into a very wide range of satellite based navigation devices—e.g. personal navigation devices (PNDs), other hand held devices such as cell phones, and vehicle-based navigation devices.

Many devices with integrated GNSS may only have accelerometers, in which case the platform orientation is difficult to obtain. For example, accelerometers are integrated into cell phones with cameras, to assist in image stabilization. In the absence of platform orientation with respect to natural reference frames the data from accelerometers is not suitable for integration into platform velocity and further into platform position. In such cases a full INS integrated algorithm cannot be implemented.

Furthermore, these accelerometers are often low cost and are only sufficient to allow dynamic detection, direction pointing or map orientation. In many applications and for many receiver platforms low cost accelerometers do not allow for INS type integration with a GNSS system.

There is a desire to use data from these integrated accelerometers, without requiring INS integration, to improve GNSS performance in aspects of satellite navigation and tracking.

For devices where full 6 degrees of freedom sensors are available, the sensors still need to be fully and accurately aligned and calibrated before a reliable INS integrated algorithm can proceed. Further, the accuracy of an INS, and how long it remains accurate, depends on the quality of the sensors and how well they are calibrated. Yet further, in most cases the calibration of the sensors needs to be updated periodically as the sensor parameters (like sensor bias) change with time, temperature of the system, etc. Furthermore, calibration of the INS sensors is required each time before starting the process of inertial navigation. The calibration of an accelerometer triad, for example, might include determining: the orientation of the triad relative to the gravity vector; the biases of the individual accelerometers; and may be even scaling factors for the individual accelerometers. Until the calibration process is complete, inertial navigation will not be available.

In prior art systems, before the accurate alignment and calibration is complete, the sensor data is not used to provide navigation assistance.

There is a desire for methods and systems for GNSS enhancement that are available without having to wait for alignment and calibration of sensors.

SUMMARY OF THE INVENTION

The present invention provides methods for improving satellite navigation by assessing the dynamic state of the platform for the satellite navigation receiver and using this data to improve navigation models and satellite tracking algorithms. The dynamic state of the receiver platform is assessed using only accelerometer data, and does not require INS integration. The assessment of the dynamic state may only be needed at a very approximate level, in which case the accelerometers need not be very accurate and need not be aligned and/or accurately calibrated.

Many satellite navigation platforms include several low cost sensors, such as accelerometers. For example, low cost accelerometers are integrated into cell phones with cameras to assist with image stabilization. These sensors are typically of sufficient quality to allow dynamic detection, direction pointing or map orientation. However, in many applications and for many receiver platforms these accelerometers do not allow for INS type integration with a GNSS system. The present invention provides methods for using data from these low cost accelerometers, without requiring INS integration, to improve GNSS performance in aspects of satellite navigation and tracking, the latter including satellite signal acquisition and reacquisition.

According to aspects of the invention, a method of accelerometer assisted satellite navigation comprises: detecting a stationary condition of an accelerometer set; gross-calibrating the accelerometer set when in the stationary condition, wherein gross-calibrating includes determining a combined-bias of the accelerometer set; defining at least two acceleration levels using the combined-bias; collecting accelerometer data; categorizing the accelerometer data into one of the acceleration levels; and utilizing the categorized accelerometer data to enhance satellite navigation. The accelerometer set may be an accelerometer triad and the bias is determined for the accelerometer triad as a whole. Utilizing the categorized accelerometer data to enhance satellite navigation may include assisting satellite tracking. The categorized acceleration data may be used to set the parameters of the tracking algorithms, in particular adjusting the bandwidth and the integration interval for the tracking algorithms, to improve the overall sensitivity and reliability of tracking the GNSS signals. In addition, the categorized acceleration data may be used to set the parameters for the loss of lock detection algorithms and lock detection algorithms for tracking GNSS signals—in particular, time constants for the loss of lock detector and lock detector algorithms can be adjusted to improve the reliability of the loss of lock detectors and lock detectors (especially in varying signal level conditions that are seen in urban canyon scenarios). Furthermore the classified acceleration levels can be used in the navigation and tracking algorithms to make a determination of minimum GNSS signal levels that should be tracked for those acceleration levels thereby improving the reliability of tracking GNSS signals. In addition, this categorized acceleration data may be used to set the dynamic model parameters in the Navigation filters—in particular, process noise models in a Kalman Filter used for Navigation in GNSS receivers.

According to further aspects of the invention a system for accelerometer assisted satellite navigation comprises: an accelerometer set for generating accelerometer data; a stationary condition detection module, for detecting a stationary condition of the accelerometer set from the accelerometer data; a gross-calibration module for providing a combined-bias of the accelerometer set from accelerometer data collected when the stationary condition of the accelerometer set is detected; an acceleration level definition module for defining at least two acceleration levels using the combined-bias of the accelerometer set; and an accelerometer data categorization module for categorizing the accelerometer data by acceleration level. The system may further comprise a GNSS subsystem for acquiring satellite signals, wherein the GNSS subsystem receives categorized accelerometer data for assisting in satellite signal acquisition. Furthermore, the system may further comprise a navigation processor for providing navigation solutions, wherein the navigation processor receives categorized accelerometer data for enhancing navigation solutions.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
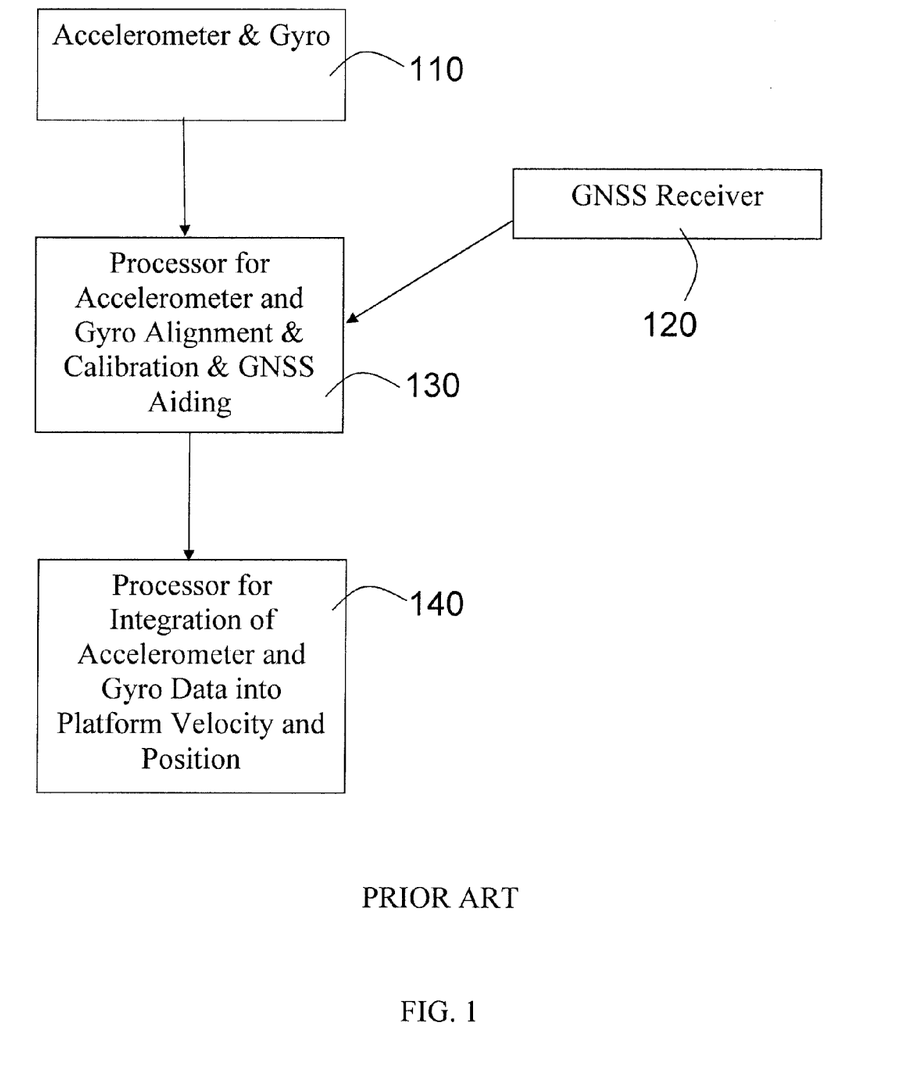
FIG. 1 is a representation of a prior art INS/GNSS system for integration of INS data into a determination of a device platform velocity and position.

FIG. 1 is a representation of a prior art INS/GNSS system for integration of INS data into a determination of a device platform velocity and position. This typical prior art inertial system includes accelerometer and gyro 110, GNSS receiver 120, a first processor 130 for accelerometer and gyro alignment and calibration, including GNSS aiding, and a second processor 140 for integration of the accelerometer and gyro data into platform velocity and position. The arrows in FIG. 1 show the direction in which data flows. The accelerometer and gyro data is used to align and calibrate the accelerometer and gyro, and the GNSS data is available to aid in this process. When alignment and calibration is complete, the accelerometer and gyro data is then integrated into the GPS data to determine the platform velocity and position. For good performance, this type of INS system relies on proper alignment and calibration of the sensors, which requires a full sensor set—accelerometers and gyros. Furthermore, when low cost sensors are used, the performance is substantially degraded. Generally, prior art systems use neither the accelerometer data nor the gyro data to enhance GNSS data collection. However, in tightly integrated INS systems calibrated and aligned accelerometer data is used to directly aid the tracking loops to enhance the tracking performance; this requires accurate calibration and alignment of the accelerometers to a useful reference frame (for example north—east—down) and a large integration filter to achieve tight integration.

Many satellite navigation platforms include several low cost sensors, such as accelerometers in an accelerometer set. For example, low cost accelerometers are integrated into cell phones with cameras to assist with image stabilization. In some cases less than 3 accelerometers may be present instead of a full set of 3 accelerometers. These sensors are typically of sufficient quality to allow dynamic detection, direction pointing or map orientation. However, in many applications and for many satellite signal receiver platforms these accelerometers do not allow for INS type integration with a GNSS system. The present invention provides methods for using data from these low cost accelerometers, without requiring INS integration, to improve GNSS performance in aspects of satellite navigation and tracking, the latter including satellite signal acquisition and reacquisition. Furthermore, the present invention provides methods for using data from these accelerometers without requiring accelerometer alignment or accurate calibration.

Accelerometer sets may be: single axis, where acceleration is measured along only one axis; dual axis, where there are two accelerometers with orthogonal axes; or accelerometer triads, where there are three mutually orthogonal accelerometers. The general concepts of the present invention are applicable to accelerometer sets of all types and configurations.

GNSS receiver platforms and accelerometer sets may be found in a wide range of devices, such as handheld/portable personal navigation devices (PND, e.g. from Garmin, TomTom, etc.) cell phones, iPhones, personal digital assistants (PDAs), handheld or laptop computers, and other types of devices with built-in GPS functionality. Furthermore, GNSS receiver platforms and accelerometer sets may be integrated into a variety of vehicles.

Figure 2:
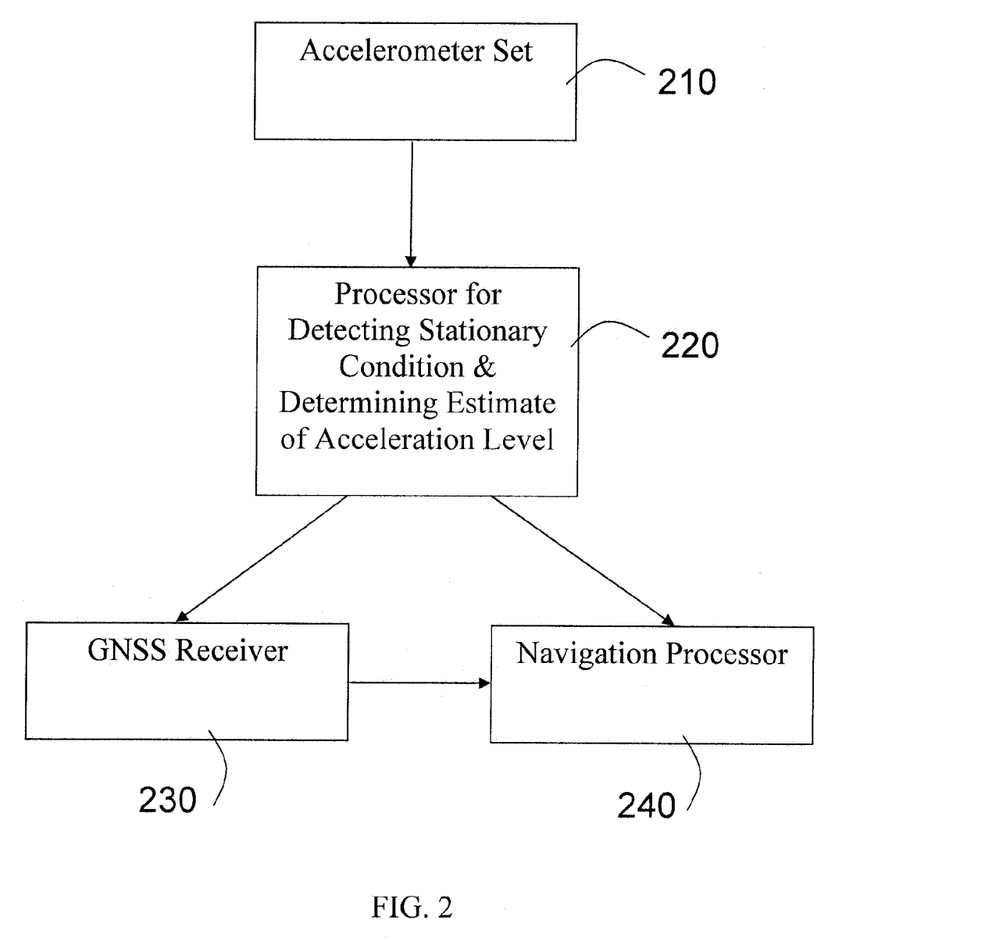
FIG. 2 is a representation of a satellite navigation and tracking system with accelerometer-only assistance, according to some embodiments of the present invention.

FIG. 2 is a representation of an accelerometer-assisted GNSS system according to some embodiments of the present invention. The system includes an accelerometer set 210, a processor for detecting a stationary condition of the platform and for estimating an acceleration level (220), a GNSS receiver 230 and a navigation processor 240. The arrows in FIG. 2 show the direction in which data flows. It is important to note that this accelerometer-assisted GNSS system does not require gyro data and does not require GNSS data for calibration of the accelerometer set.

Figure 3:
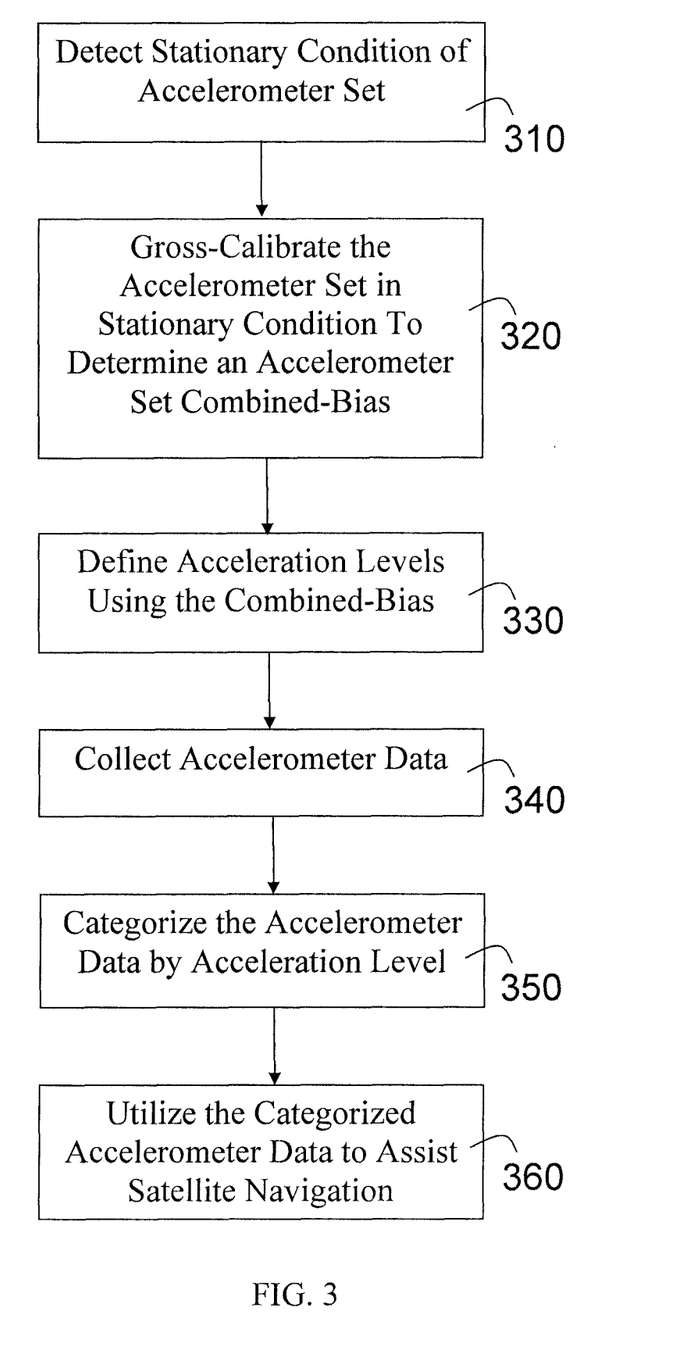
FIG. 3 is a flow chart of a process for assisting satellite tracking and navigation using accelerometer data, according to some embodiments of the present invention.

FIG. 3 shows a process for assisting satellite tracking and navigation using accelerometer data, according to some embodiments of the present invention. The process of FIG. 3 can be performed using the system of FIG. 2. The process starts by detecting a stationary condition of the accelerometer set (310). Once a stationary condition has been detected, gross-calibration of the accelerometer set is carried out to determine the bias of the accelerometer set (320). The calibration is referred to as a gross-calibration since a single bias is determined, and not a bias for each component accelerometer of the accelerometer set; hereinafter, the bias of the accelerometer set determined by the gross-calibration process is referred to as a "combined-bias." Using the combined-bias, acceleration levels are defined (330). Acceleration levels, rather than precise acceleration measurements, are sufficient for purposes of GNSS performance improvement. Accelerometer data is collected (340), and the accelerometer data is categorized by acceleration level (350). The categorized accelerometer data is then used to assist satellite navigation (360). Here satellite navigation includes satellite tracking, acquisition and reacquisition.

Detection of a stationary condition of the accelerometer can be accomplished by using a vehicle vibration profile in a car type application and using noise estimates on the accelerometer data in handheld applications, for example. Detecting the stationary condition may include collecting acceleration data, calculating the statistics of the acceleration data, and analyzing the statistics to determine when the platform is stationary. Here calculating and analyzing the variance may be appropriate. A more detailed description of systems and methods for detecting a stationary condition of a vehicle is given in United States Patent Application Publication No. US 2008/0234933 to Chowdhary et al., incorporated by reference herein in its entirety.

Once a stationary condition is detected gross-calibration of the accelerometer set can begin, which includes determining a combined-bias of the accelerometer set. The gross-calibration process may be repeated whenever a stationary condition of the platform is detected. A coarse accelerometer combined-bias can be estimated using the following formula (for an accelerometer triad):

Combined-bias=(3D acceleration value measured by accelerometer triad)−(Gravity)  (1)

This is not a true instrument bias and also includes some elements of the tilt angles with respect to a natural reference frame. Once this combined-bias is estimated the accelerometer data may be further used to estimate a coarse acceleration level of the platform using the following formulation.

Acceleration Level=(3D acceleration value measured by accelerometer triad)−(Gravity)−(Combined-Bias)  (2)

This is not a true acceleration vector, but is a magnitude of the approximate level of dynamics of the platform. Acceleration levels may be as simple as low, medium and high, or change and no-change. For example, when the platform is an automobile, low, medium and high acceleration levels might usefully be set as follows: low is less than 0.1 g, high is greater than 0.5 g, and medium is in between the two other levels. Note that accelerations are measured in units of g—a standard value of gravity, which on the Earth's surface is approximately 9.8 m/s². Clearly, when the platform is a PND and the user is walking, the acceleration levels will be smaller fractions of g. Once this dynamics level is established for the platform it can then be used to improve GNSS performance.

GNSS performance can be improved in a number of different ways, as described below, starting with improvement of navigation algorithms. Typically in a GNSS system the navigation algorithms implement a Kalman filter (KF) or a variation thereof. These NAV filters need a dynamic model to drive the state propagation. Usually this dynamic model is fixed a-priori; for example, Q for the KF is pre-determined, where Q is the variance of noise in the dynamic model equations of a Kalman filter. When platform acceleration levels are determined using data from only accelerometers (even uncalibrated and un aligned accelerometers) this can be used to set the dynamic model parameters, such as Q, in the KF dynamic model equations.

In a GNSS system typically GNSS signal tracking is limited in its dynamic tracking ability by the tracking algorithm bandwidth. In general, as the signal levels go down, so does the ability of the tracker to track dynamics. So, when platform dynamic levels are established by the accelerometer data this information can be used to determine the minimum carrier-to-noise ratio (CNO) at which this dynamics can be tracked. If measurements presented by the tracker are below the determined CNO level, then those measurements are eliminated or treated as erroneous or suspect measurements. Erroneous or suspect measurements may be validated through a more stringent testing criteria or de-weighted. An example of an algorithm that uses the dynamics level information to determine appropriate CNO levels is given below.

```
DEFAULT_CNO = 8 dBHz
LOW_DYNAMICS_CNO = 18 dBHz
MID_DYNAMICS_CNO = 23 dBHz
HIGH_DYNAMICS_CNO = 28 dBHz
CNO_THRESHOLD = DEFAULT_CNO
If (Not Stationary) CNO_THRESHOLD = LOW_DYNAMICS_CNO
If (Platform Acceleration level > MID_THRESHOLD)
CNO_THRESHOLD = MID_DYNAMICS_CNO
If (Platform Acceleration level > HIGH_THRESHOLD)
CNO_THRESHOLD = HIGH_DYNAMICS_CNO
```

Knowledge of platform dynamics levels can be used to set tracking algorithm bandwidths. For example, for low platform dynamics the bandwidth can be set to a small value and for high platform dynamics levels the bandwidths need to be set high. Using accelerometer data the latency in the dynamics level estimation will be small. Also, depending on dynamics levels and the associated tracking bandwidths, the loss of satellite lock detection time constants can be set appropriately. For example, for low dynamics and low bandwidths the loss of lock detection can be set to long time constant and for high dynamics and high bandwidths the loss of lock detection needs to be fast and should be set to a short time constant. Furthermore, knowledge of platform dynamics levels can be used to set the tracking pre-detection integration (PDI) time, allowing better noise rejection when longer integration times can be tolerated. For example, for high dynamics, a short PDI is set, and for low dynamics, a longer PDI can be used.

Knowledge of platform dynamics can also allow a better search strategy to optimize usage of hardware, perhaps saving power or reducing memory requirements, to reacquire satellite signals. For example, for high platform dynamics levels there is no point in searching for weak signals and the searches can remain strong signal searches, thereby improving reacquisition time when strong signals become available.

The searches can be more directed to reacquiring stronger signals. Weak signal searches are enabled only when the platform dynamics levels are low, and very weak signal searches are only enabled when the platform is deemed to be stationary. Furthermore, for high platform dynamics and no weak signal acquisition/reacquisition, fewer channels are required (compared with when weak signal acquisition is ongoing). Having fewer channels allows a reduction in clock speeds and voltage, resulting in reduced power consumption. Being able to reduce power consumption is important for many portable devices, such as cell phones.

Platform dynamics knowledge is also useful in correctly modeling search uncertainty growth during GNSS signal outages, thereby reducing the need to search large uncertainty spaces unnecessarily. When platform dynamics is unknown the search uncertainty must grow using the worst case assumption on dynamics so that when the signals become available again the signals will fall within the search window. This typically causes over estimation of search windows for majority of cases where the dynamics is not high. Using knowledge of platform dynamics levels the system does not need to set the worst case uncertainty growth model and uncertainty growth can be limited. For example, if the platform is in low dynamics mode for most of the time uncertainty growth can be set to small growth thereby reducing the search uncertainty compared to the worst case situation. Knowledge of platform dynamics helps to reduce/optimize the required number of channels to reacquire signals after a GNSS signal outage (for example, when entering and then exiting a tunnel).

Figure 4:
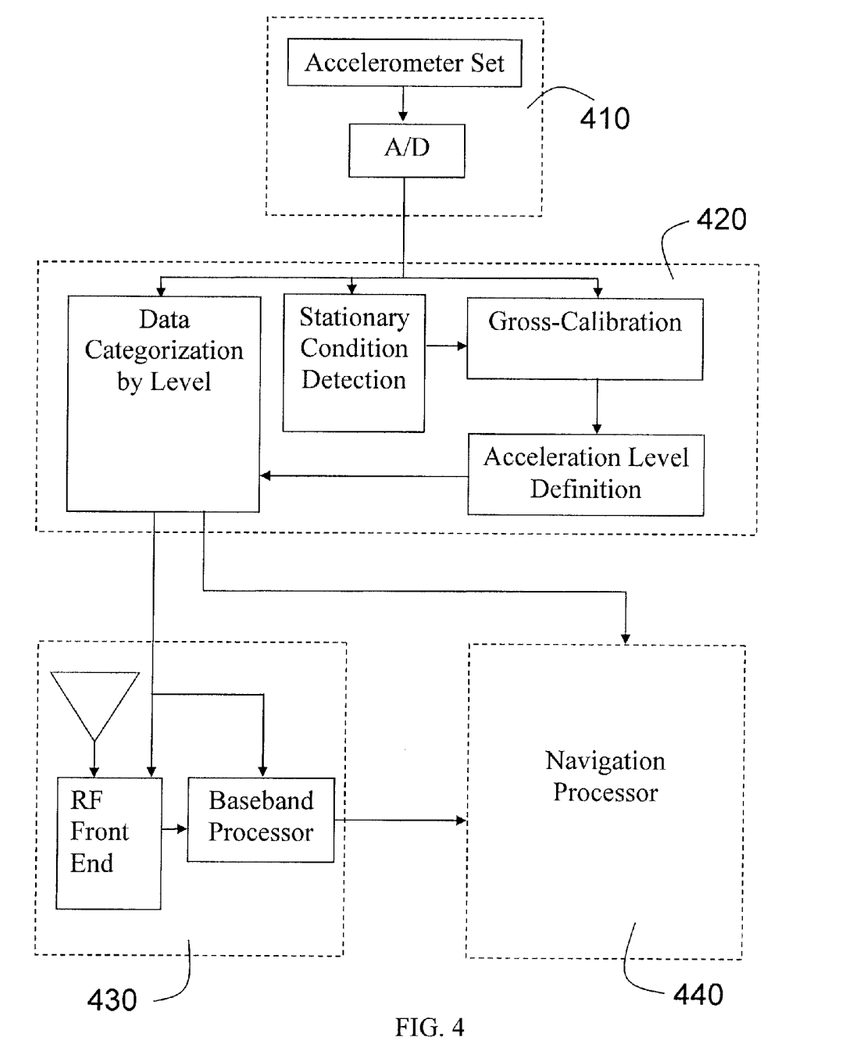
FIG. 4 is a more detailed schematic of one embodiment of the system of FIG. 2.

FIG. 4 provides a block diagram of one embodiment of the satellite navigation and tracking system of FIG. 2. FIG. 4 shows an accelerometer subsystem 410 providing accelerometer data to a processing subsystem 420, which then provides assistance data categorized by acceleration level to a GNSS subsystem 430 and navigation processor 440; the GNSS subsystem 430 acquires satellite signals and provides navigation data to the navigation processor 440 which provides navigation solutions. The accelerometer subsystem 410 includes an accelerometer set and an analog to digital converter. The GNSS subsystem 430 comprises an antenna, an RF front end and a baseband processor. The GNSS subsystem 430 may be implemented as a separate GNSS chip (e.g. a SiRFStarIV from SiRF Technologies, Inc.).

The processing subsystem 420 comprises the following modules, the function of which have been described in detail above: a stationary condition detection module for detecting when the accelerometer set is sufficiently stationary for gross-calibration to be done; a gross-calibration module for calibrating the accelerometer set to provide a combined-bias of the accelerometer set; an acceleration level definition module for defining at least two acceleration levels using the combined-bias of the accelerometer set; and an accelerometer data categorization module for categorizing the accelerometer data by acceleration level. The processing subsystem may have dedicated circuits for performing the operations of the modules. Furthermore, the modules of the processing subsystem 420 may be implemented as individual ASICs (Application Specific Integrated Circuits), DSPs (Digital Signal Processors) or similar devices, each with their own instruction and operand memory and firmware. Some of the modules may be combined with any or all of the illustrated modules or with other modules not shown. Alternatively, a general purpose processor may be used to perform certain or each of the functions of the modules. The processing subsystem 420 may include an internal memory for instructions and operands and in addition or instead may have an external memory.

The navigation system in FIG. 4 may be implemented as a single integrated system; such an integrated system is suitable for use as a personal navigation device (PND), for example. However, the GNSS subsystem 430 and the accelerometer subsystem 410 may be separate and independent from the processing subsystem 420 and navigation processor 440, and from each other. For example, if a vehicle has any integrated accelerometers, these may be used by the processing subsystem. In addition, particular components may be provided separately, such as antennas, power supplies, etc. The processing subsystem or the whole device may be provided as a PND, as a navigation component of a smartphone, a PDA (Personal Digital Assistant), or as a navigation component of any other portable device, for example.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method of accelerometer assisted satellite navigation, comprising:
   collecting accelerometer data;
   categorizing said accelerometer data into one of at least two acceleration levels depending on a magnitude of said accelerometer data, wherein a first acceleration level corresponds to a range of acceleration magnitudes that are higher than a range of acceleration magnitudes corresponding to a second acceleration level; and
   utilizing the categorized accelerometer data to enhance satellite navigation based on received satellite signals, wherein when said accelerometer data is categorized as said first acceleration level, a first condition for performing satellite navigation based on received satellite signals is used, and wherein when said accelerometer data is categorized as said second acceleration level, a second condition different than said first condition is used for performing satellite navigation based on received satellite signals.

2. A method as in claim 1, further comprising:
   detecting a stationary condition of an accelerometer set;
   gross-calibrating said accelerometer set when in said stationary condition, wherein gross-calibrating includes determining a combined-bias of said accelerometer set; and
   defining the at least two acceleration levels using said combined-bias.

3. A method as in claim 2, wherein said detecting said stationary condition comprises:
   collecting acceleration data;
   calculating the statistics of said acceleration data; and
   analyzing said statistics to determine said stationary condition.

4. A method as in claim 2, wherein said accelerometer is within a vehicle and detecting said stationary condition includes monitoring a vibration profile for said vehicle.

5. A method as in claim 2, wherein said gross-calibrating said accelerometer set is repeated whenever a stationary condition is detected.

6. A method as in claim 2, wherein said accelerometer set is an accelerometer triad and said combined-bias is determined for said accelerometer triad as a whole.

7. A method as in claim 1, wherein said utilizing said categorized accelerometer data to enhance satellite navigation includes assisting satellite tracking.

8. A method as in claim 1, wherein said utilizing said categorized accelerometer data to enhance satellite navigation includes setting an adaptive Q in a Kalman filter dynamic model using the acceleration level of the categorized acceleration data.

9. A method as in claim 1, wherein said utilizing said categorized accelerometer data to enhance satellite navigation includes setting a carrier-to-noise ratio for optimization of satellite signal collection using the acceleration level of the categorized acceleration data.

10. A method as in claim 1, wherein said utilizing said categorized accelerometer data to enhance satellite navigation includes adjusting a satellite signal tracking algorithm bandwidth using the acceleration level of the categorized acceleration data.

11. A method as in claim 1, wherein said utilizing said categorized accelerometer data to enhance satellite navigation includes adjusting a tracking pre-detection integration time using the acceleration level of the categorized acceleration data.

12. A method as in claim 1, wherein said utilizing said categorized accelerometer data to enhance satellite navigation includes setting the time constant of loss of satellite lock detection using the acceleration level of the categorized acceleration data.

13. A method as in claim 1, wherein said utilizing said categorized accelerometer data to enhance satellite navigation includes assisting in satellite signal acquisition using the acceleration level of the categorized acceleration data.

14. A method as in claim 1, wherein said utilizing said categorized accelerometer data to enhance satellite navigation includes optimizing a power use of a satellite signal receiver using the acceleration level of the categorized acceleration data.

15. A method as in claim 1, wherein said utilizing said categorized accelerometer data to enhance satellite navigation includes optimizing a number of channels needed to acquire a satellite signal.

16. A method as in claim 1, wherein said utilizing said categorized accelerometer data to enhance satellite navigation includes modeling satellite search uncertainty growth during a satellite signal outage.

17. A method as in claim 16, wherein said utilizing said categorized accelerometer data to enhance satellite navigation further includes optimizing a number of channels needed to acquire a satellite signal after said satellite signal outage ends.

18. A method as in claim 14, wherein said satellite signal receiver is within a cell phone.

19. A system for accelerometer assisted satellite navigation, said system comprising:
an accelerometer set for generating accelerometer data; and
an accelerometer data categorization module for categorizing said accelerometer data by acceleration level depending on a magnitude of said accelerometer data, wherein a first acceleration level corresponds to a range of acceleration magnitudes that are higher than a range of acceleration magnitudes corresponding to a second acceleration level; and
a navigation processor for providing navigation solutions, wherein said navigation processor is configured to utilize categorized accelerometer data from the accelerometer data categorization module for enhancing navigation solutions based on received satellite signals, and wherein when said accelerometer data is categorized as said first acceleration level, said navigation processor uses a first condition for performing satellite navigation based on received satellite signals, and wherein when said accelerometer data is categorized as said second acceleration level, said navigation processor uses a second condition different than said first condition for performing satellite navigation based on received satellite signals.

20. A system as in claim 19, further comprising:
a stationary condition detection module, for detecting a stationary condition of said accelerometer set from said accelerometer data;
a gross-calibration module for providing a combined-bias of said accelerometer set from accelerometer data collected when said stationary condition of said accelerometer set is detected; and
an acceleration level definition module for defining at least two acceleration levels using said combined-bias of said accelerometer set.

21. A system as in claim 20, further comprising:
a GNSS subsystem for acquiring satellite signals;
wherein said GNSS subsystem is configured to utilize categorized accelerometer data for assisting in satellite signal acquisition.

* * * * *